United States Patent
Maeda et al.

(10) Patent No.: US 12,478,917 B2
(45) Date of Patent: Nov. 25, 2025

(54) REGENERATION DEVICE, GAS TREATMENT DEVICE, REGENERATION METHOD, AND GAS TREATMENT METHOD

(71) Applicant: KOBE STEEL, LTD., Hyogo (JP)

(72) Inventors: Norihide Maeda, Kobe (JP); Akira Kishimoto, Kobe (JP); Takuo Shigehisa, Kobe (JP); Ken Nakanishi, Kakogawa (JP); Kunihiko Shimizu, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 498 days.

(21) Appl. No.: 18/245,340

(22) PCT Filed: Sep. 2, 2021

(86) PCT No.: PCT/JP2021/032365
§ 371 (c)(1),
(2) Date: Mar. 14, 2023

(87) PCT Pub. No.: WO2022/074977
PCT Pub. Date: Apr. 14, 2022

(65) Prior Publication Data
US 2024/0001287 A1    Jan. 4, 2024

(30) Foreign Application Priority Data

Oct. 5, 2020    (JP) ................ 2020-168358

(51) Int. Cl.
*B01D 53/02*    (2006.01)
*B01D 53/14*    (2006.01)
(Continued)

(52) U.S. Cl.
CPC ..... *B01D 53/1425* (2013.01); *B01D 53/1475* (2013.01); *B01D 53/18* (2013.01);
(Continued)

(58) Field of Classification Search
CPC ........ B01D 2252/204; B01D 2252/504; B01D 2257/504; B01D 53/1425; B01D 53/1456;
(Continued)

(56) References Cited

U.S. PATENT DOCUMENTS

| 3,855,337 A | 12/1974 | Foral, Jr. et al. |
| 3,867,112 A | 2/1975 | Honerkamp et al. |

(Continued)

FOREIGN PATENT DOCUMENTS

| CN | 108786380 A | 11/2018 |
| CN | 110559804 A | 12/2019 |
| JP | H04-126514 A | 4/1992 |

OTHER PUBLICATIONS

Hiroshi Machida et al., "Development of phase separation solvent for CO2 capture by aqueous (amine+ ether) solution", Journal of Chemical Thermodynamics, (U.S.), Elsevier Ltd., 2017, vol. 113, p. 64-70.

(Continued)

*Primary Examiner* — Christopher P Jones
(74) *Attorney, Agent, or Firm* — Studebaker Brackett PLLC

(57) ABSTRACT

Provided is a regeneration device for heating a treatment liquid in a phase-separated state due to absorption of an acidic compound to release the acidic compound and regenerate the treatment liquid. The regeneration device includes a container for storing the treatment liquid, and a first wall that partitions a space in the container into a first space and a second space. The first space includes: a heating region that receives the treatment liquid supplied from an outside of the container and in which a heating unit for heating the treatment liquid is disposed; and a static region that receives the treatment liquid from the heating region, the treatment liquid having released the acidic compound by being heated by the heating unit. The second space allows the treatment (Continued)

liquid having released the acidic compound to be discharged. The first wall is provided with an opening through which the treatment liquid in the static region flows into the second space.

11 Claims, 11 Drawing Sheets

(51) Int. Cl.
    *B01D 53/18*     (2006.01)
    *B01D 53/62*     (2006.01)
    *B01D 53/78*     (2006.01)
    *B01D 53/96*     (2006.01)

(52) U.S. Cl.
    CPC ............. *B01D 53/62* (2013.01); *B01D 53/78* (2013.01); *B01D 53/96* (2013.01); *B01D 2252/204* (2013.01); *B01D 2252/504* (2013.01); *B01D 2257/504* (2013.01)

(58) Field of Classification Search
    CPC .... B01D 53/1475; B01D 53/18; B01D 53/62; B01D 53/78; B01D 53/96; Y02C 20/40
    See application file for complete search history.

(56) References Cited

U.S. PATENT DOCUMENTS

| | | | | |
|---|---|---|---|---|
| 5,231,834 | A * | 8/1993 | Burnett | F25B 21/00 505/891 |
| 6,464,466 | B1 * | 10/2002 | Nomura | C23C 16/4412 417/48 |
| 7,807,129 | B2 * | 10/2010 | Kaye | H01M 8/04022 423/648.1 |
| 2004/0112077 | A1 * | 6/2004 | Forkosh | F24F 5/001 62/271 |
| 2007/0148068 | A1 | 6/2007 | Burgers et al. | |
| 2010/0258007 | A1 | 10/2010 | Popov et al. | |
| 2011/0283736 | A1 * | 11/2011 | Manabe | F25B 30/04 62/476 |
| 2014/0116252 | A1 * | 5/2014 | Carroni | B01D 53/1475 261/95 |
| 2014/0174903 | A1 | 6/2014 | Edwards et al. | |
| 2014/0371507 | A1 | 12/2014 | Laricchia et al. | |
| 2018/0311610 | A1 | 11/2018 | Kishimoto et al. | |

OTHER PUBLICATIONS

Hiroshi Machida et al., "Low temperature swing process for CO2 absorption—desorption using phase separation CO2 capture solvent", International Journal of Greenhouse Gas Control, (U.S.), Elsevier Ltd., 2018, vol. 75, p. 1-7.

The partial European search report issued by the European Patent Office on Feb. 6, 2024, which corresponds to European Patent Application No. 21877280.4 and is related to U.S. Appl. No. 18/245,340.

The extended European search report issued by the European Patent Office on Jun. 6, 2024, which corresponds to European Patent Application No. 21877280.4-1014 and is related to U.S. Appl. No. 18/245,340.

* cited by examiner

REGENERATION DEVICE, GAS TREATMENT DEVICE, REGENERATION METHOD, AND GAS TREATMENT METHOD

TECHNICAL FIELD

The present invention relates to a regeneration device, a gas treatment device, a regeneration method, and a gas treatment method.

BACKGROUND ART

Techniques for separating an acidic compound by bringing gas to be treated containing an acidic compound into contact with a treatment liquid are conventionally known. Known examples of this type of technique include a technique described in Non-Patent Literature 1 below, the technique using a treatment liquid that has liquid-liquid phase separation into a first phase part (e.g., an amine phase) having a high acidic compound content and a second phase part (e.g., an ether phase) having a low acidic compound content.

Non-Patent Literature 2 below describes a gas treatment device including: an absorber that absorbs an acidic compound in gas to be treated into a treatment liquid; a regeneration device that desorbs the acidic compound from the treatment liquid by heating; and a circulation path that introduces the treatment liquid from the absorber into the regeneration device and returns the treatment liquid from the regeneration device to the absorber. This device supplies the treatment liquid phase-separated in the absorber to the regeneration device without separation into two liquids of the first phase part and the second phase part. When the phase-separated liquid is supplied to the regeneration device without separation into two liquids as described above, a contact area between the first phase part and the second phase part is increased, thereby promoting regeneration of the treatment liquid (emission of the acidic compound).

Promotion of regeneration of the treatment liquid due to increase in contact area between the first phase part (e.g., the amine phase) and the second phase portion (e.g., the ether phase) is described as follows by extraction action of the regenerated amine acted by the second phase part. The phase-separated liquid contains a large amount of the acidic compound in the first phase part. Specifically, when the acidic compound is $CO_2$ and the treatment liquid is a primary amine, the acidic compound exists in the first phase part in the form of $RNH_3^+ + RNHCOO^-$ or the like.

Heating these causes separation into regenerated amine ($RNH_2$) and $CO_2$ due to a reaction such as $RNH_3^+ + RNHCOO^- \rightarrow 2RNH_2 + CO_2$, and thus achieving regeneration of the treatment liquid. At this time, the regenerated amine is extracted into the second phase part. As a result, separation reaction in the first phase part is likely to proceed to the right in the above reaction formula, and $CO_2$ is easily desorbed. Extraction action of the regenerated amine due to the second phase part as described above proceeds at a liquid-liquid interface between the first phase part and the second phase part, so that the desorption of $CO_2$ is promoted by increasing a contact area between the first phase part and the second phase part.

The device according to Non-Patent Literature 2 below enables promoting desorption of an acidic compound by supplying the phase-separated treatment liquid without separation into two liquids to the regeneration device to increase a contact interface between the first phase part and the second phase part. Unfortunately, the device according to the literature has room for improvement in that the treatment liquid in a phase-separated state before regeneration may be mixed with the treatment liquid after regeneration and during return from the regeneration device to the absorber.

CITATION LIST

Patent Literature

Non-Patent Literature 1: Hiroshi Machida et al., "Development of phase separation solvent for $CO_2$ capture by aqueous (amine+ether) solution", Journal of Chemical Thermodynamics, (U.S.), Elsevier Ltd., 2017, Vol. 113, p. 64-70

Non-Patent Literature 2: Hiroshi Machida et al., "Low temperature swing process for $CO_2$ absorption—desorption using phase separation $CO_2$ capture solvent", International Journal of Greenhouse Gas Control, (U.S.), Elsevier Ltd., 2018, Vol. 75, p. 1-7

SUMMARY OF INVENTION

An object of the present invention is to provide a regeneration device and a regeneration method that promote desorption of an acidic compound and enable selective extraction of a treatment liquid after regeneration, a gas treatment device including the regeneration device, and a gas treatment method in which the regeneration method is performed.

A regeneration device according to an aspect of the present invention is for heating a treatment liquid in a phase-separated state due to absorption of an acidic compound to release the acidic compound and regenerate the treatment liquid. The regeneration device includes a container for storing the treatment liquid, and a first wall that partitions a space in the container into a first space and a second space. The first space includes: a heating region that receives the treatment liquid supplied from an outside of the container and in which a heating unit for heating the treatment liquid is disposed; and a static region that receives the treatment liquid from the heating region, the treatment liquid having released the acidic compound by being heated by the heating unit. The second space allows the treatment liquid having released the acidic compound to be discharged to the outside of the container. The first wall is provided with an opening through which the treatment liquid in the static region flows into the second space.

A gas treatment device according to another aspect of the present invention includes: an absorption device for bringing gas to be treated into contact with a treatment liquid to absorb an acidic compound contained in the gas to be treated into the treatment liquid; and the regeneration device described above.

A regeneration method according to still another aspect of the present invention includes: supplying a treatment liquid phase-separated by absorption of an acidic compound to a first space in a container; releasing the acidic compound from the treatment liquid by heating the treatment liquid supplied to the first space; and allowing the treatment liquid having released the acidic compound to temporarily remain in the first space, and then allowing the treatment liquid to flow from the first space into a second space through an opening formed in a wall partitioning the first space and the second space.

A gas treatment method according to still another aspect of the present invention includes: bringing a gas to be treated containing an acidic compound into contact with a treatment liquid in an absorption device to cause the acidic compound to be absorbed into the treatment liquid to phase-separate the treatment liquid; feeding the phase-separated treatment liquid from the absorption device to a regeneration device; and performing the regeneration method in the regeneration device to extract the treatment liquid having released the acidic compound from the regeneration device and return the treatment liquid to the absorption device.

DESCRIPTION OF EMBODIMENTS

Figure 1:
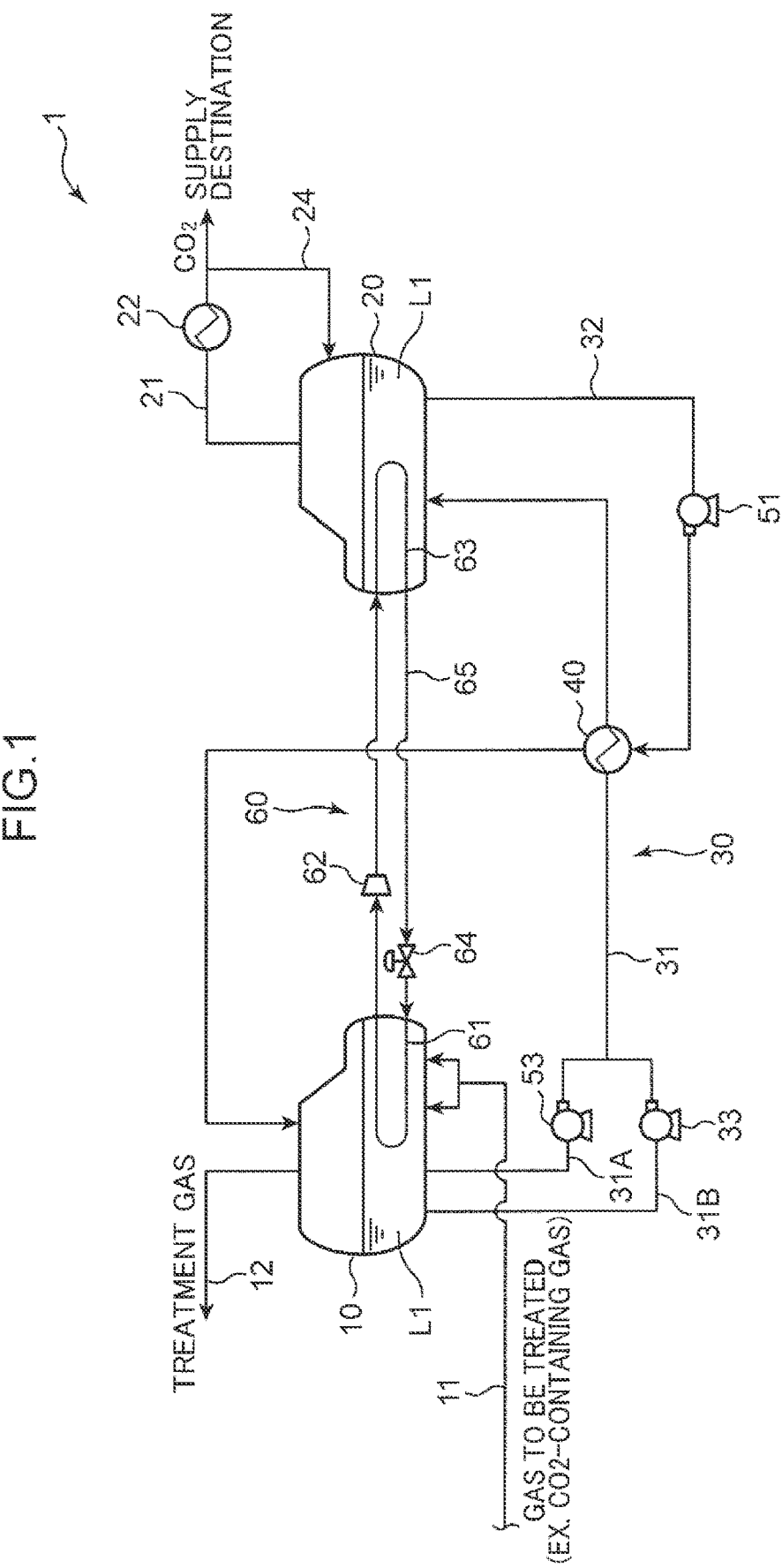
FIG. 1 is a diagram schematically illustrating a configuration of a gas treatment device according to a first embodiment.

Hereinafter, embodiments will be described with reference to the accompanying drawings. The following embodiments are examples embodying the present invention, and are not intended to limit the technical scope of the present invention.

First Embodiment

<Gas Treatment Device>

First, a gas treatment device 1 according to a first embodiment will be described with reference to FIG. 1. The gas treatment device 1 brings gas to be treated such as a $CO_2$-containing gas into contact with a treatment liquid L1 to separate an acidic compound contained in the gas to be treated. The treatment liquid L1 used in the gas treatment device 1 will be first described in detail.

The treatment liquid L1 is capable of reversibly absorbing and releasing an acidic compound such as $CO_2$, and changes from a state of a single phase to a state of two-phase separation by absorption of the acidic compound, and returns from the state of two-phase separation to the state of a single phase by release of the acidic compound. The treatment liquid L1 is an alkaline absorbent containing water, an amine compound, and an organic solvent, for example. A desirable example consists of 30 wt % amine compound, 60 wt % organic solvent, and 10 wt % water.

Examples of the amine compound include primary amines such as 2-aminoethanol (MEA) and 2-(2-aminoethoxy) ethanol (AEE), secondary amines such as 2-(methylamino) ethanol (MAE), 2-(ethylamino) ethanol (EAE) and 2-(butylamino) ethanol (BAE), and tertiary amines such as triethanolamine (TEA), N-methyldiethanolamine (MDEA), tetramethylethylenediamine (TEMED), pentamethyldiethylenetriamine (PMDETA), hexamethyltriethylenetetramine and bis(2-dimethylaminoethyl) ether.

Examples of the organic solvent include I-butanol, 1-pentanol, octanol, diethylene glycol diethyl ether (DEGDEE), and diethylene glycol dimethyl ether (DEGDME), and a mixture of some of these solvents may be used.

According to Non-Patent Literature 1, when a combination of an amine compound and an organic compound is appropriately selected, an absorbent is obtained in which absorption of the acidic compound causes the absorbent to be separated into two phases of a phase having a high content ratio of an acidic compound and a phase having a low content ratio of the acidic compound.

Next, a configuration of the gas treatment device 1 will be described. As illustrated in FIG. 1, gas treatment device 1 mainly includes an absorption device 10, a regeneration device 20, a circulation path 30, a heat exchanger 40, and a heat pump 60.

The absorption device 10 brings gas to be treated into contact with the treatment liquid L1 to absorb an acidic compound (e.g., $CO_2$), which is contained in the gas to be treated, into the treatment liquid L1. The absorption of the acidic compound in the absorption device 10 is an exothermic reaction.

As illustrated in FIG. 1, the absorption device 10 is connected to a gas supply path 11 for supplying gas to be treated, a gas discharge path 12 for discharging gas after treatment, a first flow path 31 for feeding the treatment liquid L1 that has absorbed $CO_2$ to the regeneration device 20, and a second flow path 32 for returning the treatment liquid L1 after regeneration and having released $CO_2$ from the regeneration device 20 to the absorption device 10. The first flow path 31 and the second flow path 32 constitute a circulation path 30.

The gas supply path 11 is connected to a bottom of the absorption device 10, and the gas discharge path 12 is connected to an upper part of the absorption device 10. The first flow path 31 is branched at its upstream end into two flow paths (a first branch path 31A and a second branch path 31B), and each of the branch paths 31A and 31B is connected to the bottom of the absorption device 10. The branch paths 31A and 31B are provided with liquid feed pumps 53 and 33, respectively. The second flow path 32 is connected at its downstream end to the upper part of the absorption device 10. The second flow path 32 is also provided with a liquid feed pump 51. The absorption device 10 will be described about its internal configuration in detail later.

The regeneration device 20 heats the treatment liquid L1 in a phase-separated state due to absorption of the acidic compound to release the acidic compound from the treatment liquid L1 and regenerate the treatment liquid L1. The release of the acidic compound from the treatment liquid L1 is an endothermic reaction. When the treatment liquid L1 is heated in the regeneration device 20, not only the acidic compound is released but also water contained in the treatment liquid L1 is partially evaporated.

As illustrated in FIG. 1, the regeneration device 20 is connected to the downstream end of the first flow path 31 and the upstream end of the second flow path 32. The first flow path 31 is connected to the bottom of the regeneration device 20, and introduces the treatment liquid L1 discharged from the absorption device 10 into the regeneration device 20. The second flow path 32 is also connected to the bottom of the regeneration device 20, and the second flow path 32 discharges the treatment liquid L1 from the regeneration device 20.

The regeneration device 20 is connected to a supply path 21. The supply path 21 feeds the acidic compound (e.g., $CO_2$) obtained in the regeneration device 20 to a supply destination. The supply path 21 is provided with a capacitor 22 for cooling mixed gas of gas of the acidic compound and water vapor. When the mixed gas is cooled, the water vapor is condensed, and thus the water vapor can be separated from the gas of the acidic compound. The separated water vapor is returned to the regeneration device 20 through a return flow path 24. As the capacitor 22, a heat exchanger using inexpensive cooling water such as river water can be used. The regeneration device 20 will be described about its internal configuration in detail later.

The heat exchanger 40 is connected to the first flow path 31 and the second flow path 32, and causes heat exchange between the treatment liquid L1 flowing through the first flow path 31 and the treatment liquid L1 flowing through the second flow path 32. Although the heat exchanger 40 is configured of a plate heat exchanger or the like, for example, the heat exchanger 40 may be configured of a microchannel heat exchanger capable of heat exchange between fluids having a relatively small temperature difference. This configuration improves energy efficiency.

The heat pump 60 is a heat transport unit that transports reaction heat generated in the absorption device 10 to the regeneration device 20. As illustrated in FIG. 1, the heat pump 60 includes a circulation flow path 65 in a closed-loop shape in which a refrigerant is sealed, and a compressor 62, an evaporator 61, an expansion mechanism 64, and a condenser 63 that are each provided in the circulation flow path 65.

The evaporator 61 includes a heat transfer tube and is disposed in the absorption device 10. The exothermic reaction is caused by absorbing $CO_2$ into the treatment liquid L1 in the absorption device 10. This reaction heat is given to a refrigerant in a liquid form flowing in the evaporator 61. The refrigerant in a liquid form flowing in the evaporator 61 is heated by the heat and evaporated.

The refrigerant in a gaseous form is compressed by the compressor 62, and then flows into the condenser 63. The condenser 63 includes a heat transfer tube and is disposed in the regeneration device 20. The endothermic reaction is caused by releasing $CO_2$ from the treatment liquid L1 in the regeneration device 20. The refrigerant in a gaseous form flowing in the condenser 63 is condensed by cold energy due to the endothermic reaction. At this time, the treatment liquid L1 is heated by the condenser 63. That is, the condenser 63 functions as a heating unit that heats the treatment liquid L1. The condensed refrigerant in a liquid form is expanded and decompressed by the expansion mechanism 64, and flows into the evaporator 61. As described above, the reaction heat of the absorption device 10 is transported to the regeneration device 20 by circulation of the refrigerant.

<Absorption Device>

Figure 2:
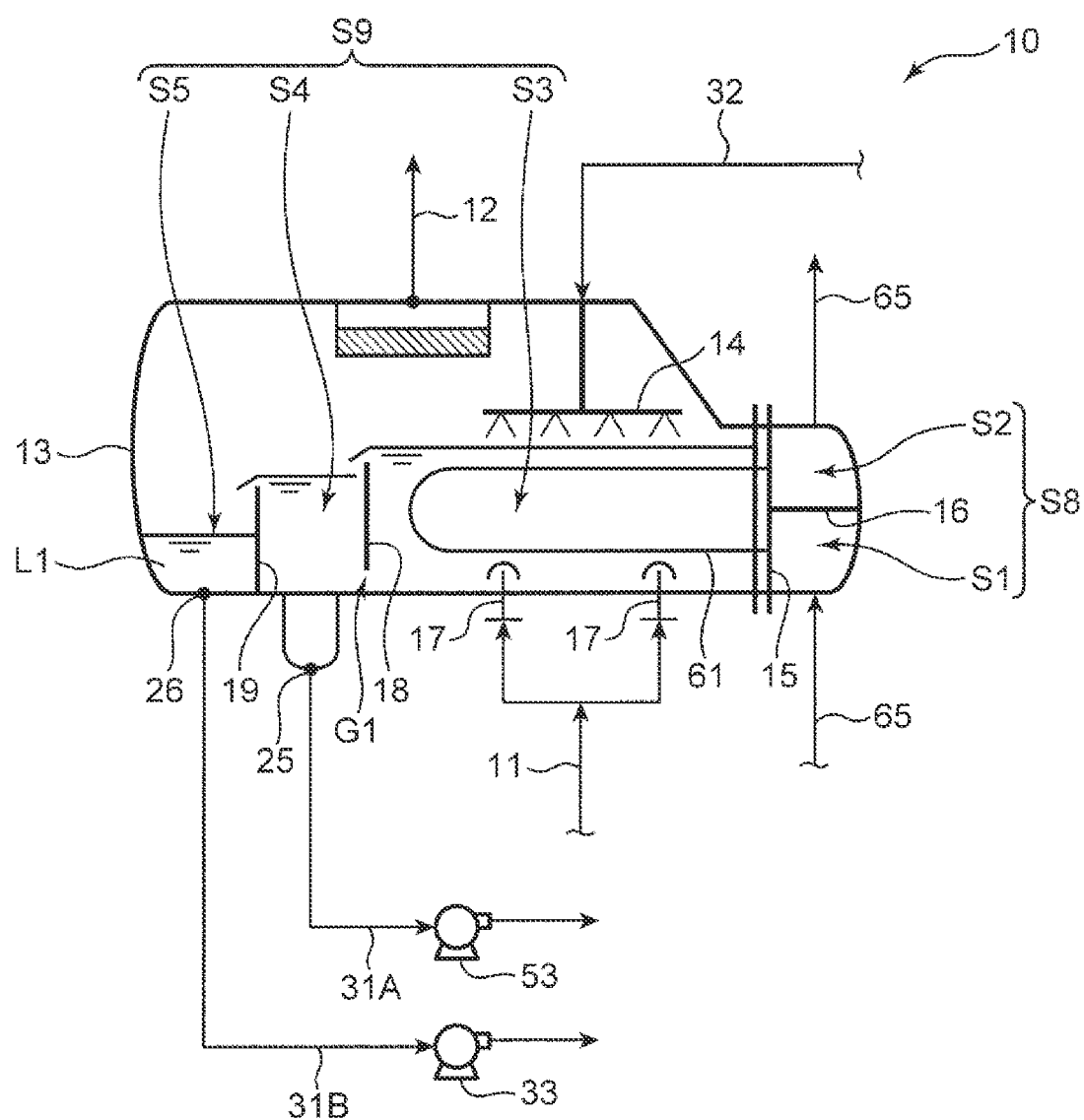
FIG. 2 is a diagram schematically illustrating a configuration of an absorption device according to the first embodiment.

Next, a configuration of the absorption device 10 will be described in more detail with reference to FIG. 2. The following description shows up and down that means a vertical direction, and lateral that means a horizontal direction, for convenience. As illustrated in FIG. 2, the absorption device 10 includes a container 13 that is a horizontally long tank, a first wall 18, a second wall 19, a gas feeder 17, and a treatment liquid feeder 14.

The container 13 is provided inside with a tube plate 15 for fixing the heat transfer tube of the evaporator 61. The heat transfer tube has a horizontally long U-shape turned sideways, and is fixed at both ends to the tube plate 15. The tube plate 15 partitions a space in the container 13 into an in-out space S8 for the refrigerant of the heat pump 60 to come in and out, and a storage space S9 in which the treatment liquid L1 is stored. The heat transfer tube of the evaporator 61 is disposed in the storage space S9.

As described above, when a horizontal tank (e.g., a kettle type) is used as the container 13, requirement of increase in length of the heat transfer tube of the evaporator 61 for expansion of the heat transfer area can be addressed by increasing the container 13 in horizontal size. When the container 13 is vertically long, expansion of the heat transfer area to a certain extent or more may be difficult due to height restriction or the like. In contrast, when a horizontally long tank is used, there is no such restriction. Thus, a necessary heat transfer area can be secured by freely setting the heat transfer area.

The in-out space S8 is partitioned into an inlet space S1 and an outlet space S2 by a partition plate 16. The refrigerant in a liquid form having flowed from the circulation flow path 65 into the inlet space S1 flows into the heat transfer tube of the evaporator 61 from an opening at one end, and flows from the one end toward the other end. At this time, the refrigerant in a liquid form evaporates by receiving heat of the absorption reaction of the acidic compound. Then, the refrigerant in a gaseous form passes through the outlet space S2 and flows out to the circulation flow path 65.

The first wall 18 is erected from the bottom of the container 13 in the container 13, and allows a first space S3 and a second space S4 to be partitioned from each other in the storage space S9. As illustrated in FIG. 2, the evaporator 61, the gas feeder 17, and the treatment liquid feeder 14 are disposed in the first space S3. The present embodiment includes an opening G1 through which liquid can flow, the opening G1 being formed in a central part of the first wall 18 in a height direction or below the central part, specifically, in a lowermost part.

The second wall 19 is erected from the bottom of the container 13 on a side opposite to the evaporator 61 with respect to the first wall 18, and allows the second space S4 and a third space S5 to be partitioned from each other in the storage space S9. The second wall 19 is located on the opposite side of the tube plate 15 as viewed from the first wall 18, and is provided with a space (second space S4) from the first wall 18. The second wall 19 is substantially parallel to the first wall 18, and has an upper end positioned below an upper end of the first wall 18, or closer to the bottom of the container 13 than the upper end of the first wall 18.

The bottom of the container 13 includes a part that faces the second space S4, and the part is provided with a first outflow port 25. The bottom includes a part that faces the third space S5 and the part is provided with a second outflow port 26. The first branch path 31A is connected at one end to the first outflow port 25, and the second branch path 31B is connected at one end to the second outflow port 26.

The gas feeder 17 is a nozzle for supplying gas to be treated containing an acidic compound into the container 13 (first space S3), and is disposed at the bottom of the container 13. More specifically, the gas feeder 17 is located below the heat transfer tube of the evaporator 61 and has a gas ejection port facing upward. The present embodiment includes multiple gas feeders 17 disposed at intervals along the bottom of the container 13, and the gas supply path 11 is branched at its downstream end connected to each of the gas feeders 17.

The gas ejection port of the gas feeder 17 is located below a liquid level of the treatment liquid L1. This configuration allows gas after being ejected to become air bubbles that float upward in the treatment liquid L1. This action stirs the treatment liquid L1. As a result, heat transfer from the treatment liquid L1 to the refrigerant of the heat pump 60 (the refrigerant flowing in the heat transfer tube of the evaporator 61) can be promoted, and absorption of the acidic compound also can be promoted by improving gas-liquid contact between the gas to be treated and the treatment liquid L1. The gas ejection port can be directed toward the heat transfer tube of the evaporator 61. In this case, the heat transfer from the treatment liquid L1 to the refrigerant is further promoted.

The treatment liquid feeder 14 is configured to supply the treatment liquid L1 returned from the regeneration device 20 (FIG. 1) into the container 13 (the first space S3). The treatment liquid feeder 14 is connected to the downstream end of the second flow path 32. As illustrated in FIG. 2, the treatment liquid feeder 14 extends in a lateral direction, and is provided with multiple liquid supply ports at intervals in the lateral direction. The treatment liquid feeder 14 is disposed above the heat transfer tube of the evaporator 61 (or above the liquid level of the treatment liquid L1) with the liquid supply ports facing downward. The liquid supply ports of the treatment liquid feeder 14 are opened directly above the first space S3, but may be opened in the first space S3.

<Regeneration Device>

Figure 3:
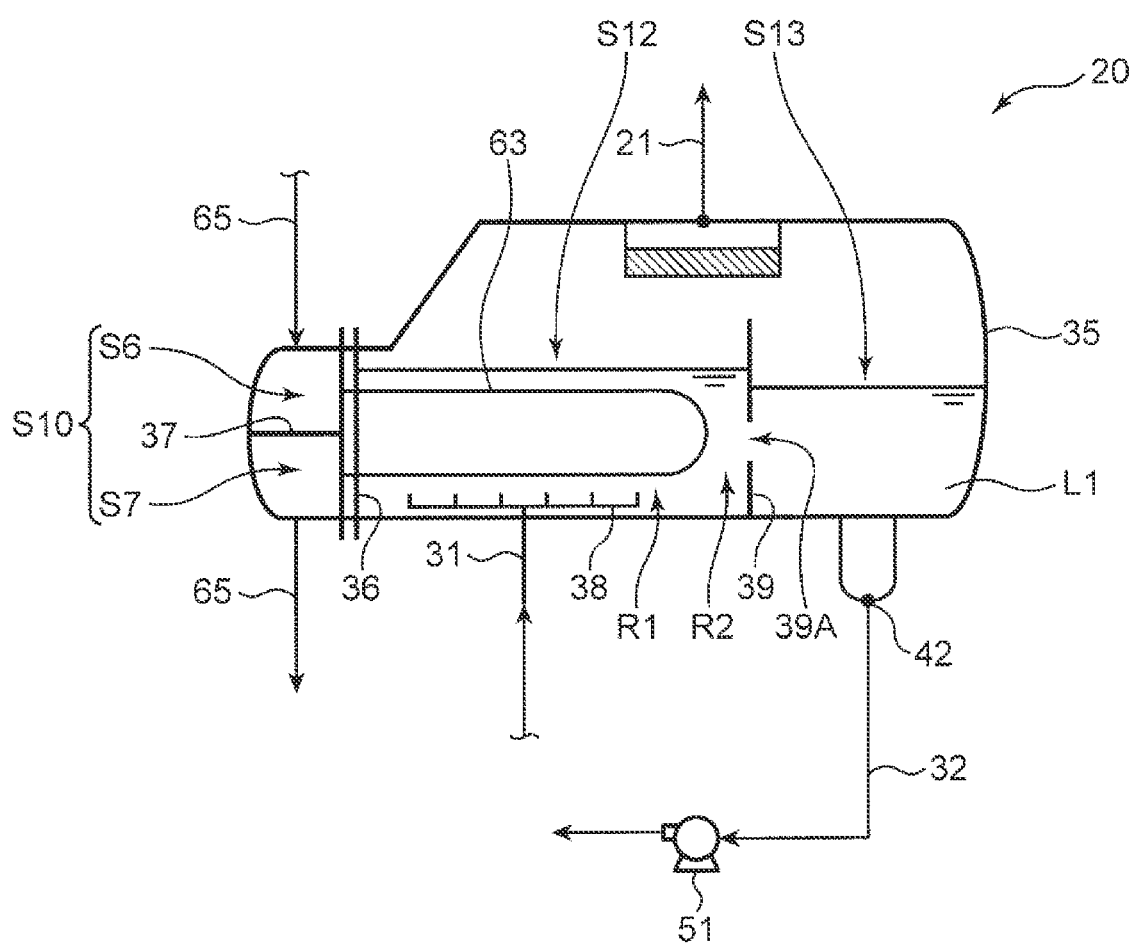
FIG. 3 is a diagram schematically illustrating a configuration of a regeneration device according to the first embodiment.

Next, a configuration of the regeneration device 20 will be described in detail with reference to FIG. 3. As illustrated in FIG. 3, the regeneration device 20 includes a container 35 that is a horizontally long tank, a first wall 39, and a treatment liquid feeder 38.

The container 35 stores the treatment liquid L1 fed from the absorption device 10 (FIG. 2). The container 35 of a horizontal tank (e.g., a kettle type or the like) is used in the present embodiment because a degree of freedom in setting a heat transfer area contributing to heat exchange between the treatment liquid L1 and the refrigerant of the heat pump 60 is taken into consideration as in the absorption device 10.

The first wall 39 is erected from a bottom of the container 35 in the container 35, and partitions a space in the container 35 into a first space S12 and a second space S13. The first space S12 includes a heating region R1 to which the treatment liquid L1 is supplied and in which a heating unit (condenser 63) that heats the treatment liquid L1 is disposed, and a static region R2 in which the treatment liquid L1 having released an acidic compound by heating temporarily stays. The heating region R1 is a first receiving region that receives the treatment liquid L1 supplied to the first space S12 from the outside of the container 35. The static region R2 is a second receiving region that receives, from the heating region R1, at least the treatment liquid L1 after release of the acidic compound in the treatment liquid L1 in the heating region R1. The second space S13 is formed to discharge the treatment liquid L1 after releasing the acidic compound, and is provided with an outflow port 42 of the treatment liquid L1.

The container 35 is provided inside with a tube plate 36 for fixing a heat transfer tube of the condenser 63. The heat transfer tube allows a refrigerant (heating medium) that exchanges heat with the treatment liquid L1 to flow therethrough. The heat transfer tube has a horizontally long U-shape turned sideways and is fixed at both ends to the tube plate 36. The tube plate 36 divides from the first space S12 an in-out space S10 for the refrigerant of the heat pump 60 to come in and out. The heating region R1 is located in the first space S12 while disposing the heat transfer tube of the condenser 63, and the static region R2 is adjacent to the heating region R1 and is located in the first space S12 while disposing no heat transfer tube, or is located between a bottom of the U-shape turned sideways of the heat transfer tube and the first wall 39.

The in-out space S10 is partitioned into an inlet space S6 and an outlet space S7 by a partition plate 37. The refrigerant in a liquid form having flowed from the circulation flow path 65 into the inlet space S6 flows into the heat transfer tube of the condenser 63 from an opening at one end, and flows from the one end toward the other end. At this time, when the treatment liquid L1 receives heat from the refrigerant, the acidic compound is released from the treatment liquid L1, and the refrigerant is condensed. Then, the refrigerant in a liquid form passes through the outlet space S7 and flows out to the circulation flow path 65.

The treatment liquid feeder 38 is a nozzle that supplies the treatment liquid L1 before regeneration fed from the absorption device 10 to the heating region R1, and is connected to the downstream end of the first flow path 31. The treatment liquid feeder 38 in the present embodiment is disposed close to the bottom of the container 35. More specifically, the treatment liquid feeder 38 extends along a bottom surface of the container 35 below the condenser 63, and is provided with multiple supply ports (nozzle ejection ports) spaced apart from each other. Each of the supply ports faces upward (or toward the condenser 63), and the treatment liquid L1 is supplied toward the heat transfer tube of the condenser 63 from the supply ports.

The first wall 39 is provided with an opening 39A through which the treatment liquid L1 in the static region R2 flows into the second space S13. As illustrated in FIG. 3, the opening 39A is formed in a central part of the first wall 39 in the height direction or in a part closer to the bottom of the container 35 than the central part to allow at least a part of the opening to overlap the heat transfer tube of the condenser 63 in the height direction. Providing the opening 39A enables the treatment liquid L1 after regeneration to be easily separated from the treatment liquid L1 before regeneration in the regeneration device 20 as described below.

<Gas Treatment Method, Regeneration Method>

Next, a gas treatment method and a regeneration method according to the present embodiment will be described. The present method is configured by the following processes such that an acidic compound (e.g., $CO_2$) contained in gas to be treated is absorbed into the treatment liquid L1 and the acidic compound is released from the treatment liquid L1 by heating.

First, the gas to be treated containing the acidic compound comes into contact with the treatment liquid L1 in the absorption device 10. As a result, the acidic compound is absorbed into the treatment liquid L1, and the treatment liquid L1 is phase-separated. Specifically, the gas to be treated is supplied to the first space S3 from the gas feeder 17 while the treatment liquid L1 is stored in the storage space S9 of the absorption device 10.

As a result, the gas to be treated in a bubble form and the treatment liquid L1 come into contact with each other, and the acidic compound in the gas to be treated is absorbed into the treatment liquid L1. Specifically, when the acidic compound is $CO_2$ and the treatment liquid L1 contains a primary amine, an absorption reaction of $CO_2$ occurs according to a reaction formula such as $2RNH_2 + CO_2 \rightarrow RNH_3^+ + RNHCOO^-$. The gas to be treated contains other gas components such as nitrogen in addition to the acidic compound such as $CO_2$, so that a stirring effect of the treatment liquid L1 by the gas to be treated in a bubble shape is maintained even when the absorption of the acidic compound progresses.

As a result, the treatment liquid L1 is separated in the first space S3 into a first liquid phase part (e.g., an amine phase) having a high content ratio of the acidic compound and a second liquid phase part (e.g., an ether phase) having a low content ratio of the acidic compound. The second liquid phase part has a lower specific gravity than the first liquid phase part in the present embodiment.

The second liquid phase part having a smaller specific gravity overflows from the upper end of the first wall 18 and flows into the second space S4, and the first liquid phase part having a larger specific gravity passes through the opening G1 of the first wall 18 and flows into the second space S4. The second liquid phase part further overflows from an upper end of the second wall 19 and flows into the third space S5.

As described above, the first liquid phase part and the second liquid phase part of the treatment liquid L1 can be separated in the container 13. Then, the first liquid phase part flows out from the first outflow port 25 to the first branch path 31A, and the second liquid phase part flows out from the second outflow port 26 to the second branch path 31B. As a result, a volume flow ratio between both the liquid phase parts in the treatment liquid L1 to be fed to the regeneration device 20 can be maintained constant.

Next, the treatment liquid L1 having been phase-separated is fed to the regeneration device 20 from the absorption device 10. Specifically, the first liquid phase part and the second liquid phase part are fed to the regeneration device 20 by the liquid feed pumps 53 and 33, respectively. At this time, both the liquid phase parts are mixed in the middle of the first flow path 31 (at a junction of the first branch path 31A and the second branch path 31B), and flow into the regeneration device 20 in a two-phase state. The treatment liquid L before regeneration is heated by heat exchange with the treatment liquid L1 after regeneration in the heat exchanger 40 before flowing into the regeneration device 20.

Next, the treatment liquid L1 is heated in the regeneration device 20, and the treatment liquid L1 having released the acidic compound by heating is extracted from the regeneration device 20 and returned to the absorption device 10. This regeneration step is performed with a regeneration method according to the present embodiment described below.

First, the present regeneration method includes supplying the treatment liquid L1 having been phase-separated by absorption of the acidic compound to the first space S12 in the container 35 from the first flow path 31. Specifically, the treatment liquid L1 brought into a two-phase state is ejected from the nozzle ejection ports of the treatment liquid feeder 38 to the heating region R1.

Next, the treatment liquid L1 supplied to the heating region R1 is heated through heat exchange with the refrigerant flowing in the condenser 63 to release the acidic compound from the treatment liquid L1. The treatment liquid L1 having released the acidic compound is mainly located between the first liquid phase part (e.g., the amine phase) and the second liquid phase part (e.g., the ether phase). At this time, although the treatment liquid L1 is stirred by gas bubbles of the released acidic compound or a jet of the treatment liquid L1 in the heating region R1, stirring is less likely to occur in the static region R2.

Thus, the treatment liquid L1 having released the acidic compound is accumulated in the static region R2 without being affected by stirring. As a result, the treatment liquid L1 after regeneration is stabilized in height position in the static region R2, so that the treatment liquid L1 having released the acidic compound remains at a position substantially coinciding with a height position of the opening 39A. Then, the treatment liquid L1 after regeneration flows into the second space S13 from the static region R2 of the first space S12 through the opening 39A. After that, the treatment liquid L1 after regeneration flows out of the regeneration device 20 through the outflow port 42, and is returned to the absorption device 10 through the second flow path 32.

As described above, the present embodiment enables regenerating the treatment liquid L1 by heating the treatment liquid L1 in a phase-separated state in the regeneration device 20 to release the acidic compound. During this regeneration treatment, the treatment liquid L1 is stirred and mixed by the acidic compound in a gaseous form (e.g., $CO_2$) released from the treatment liquid L1, so that a contact interface between the first liquid phase part (e.g., the amine phase) and the second liquid phase part (e.g., the ether phase) increases, and thus desorption of the acidic compound can be promoted. The present embodiment enables the treatment liquid L1 after regeneration and having released the acidic compound to flow into the second space S13 through the opening 39A of the first wall 39 after the treatment liquid L1 is accumulated in the static region R2. As a result, the treatment liquid L1 after regeneration can be easily separated from the treatment liquid L1 before regeneration, and the treatment liquid L1 after regeneration can be selectively extracted from the regeneration device 20.

Second Embodiment

Figure 4:
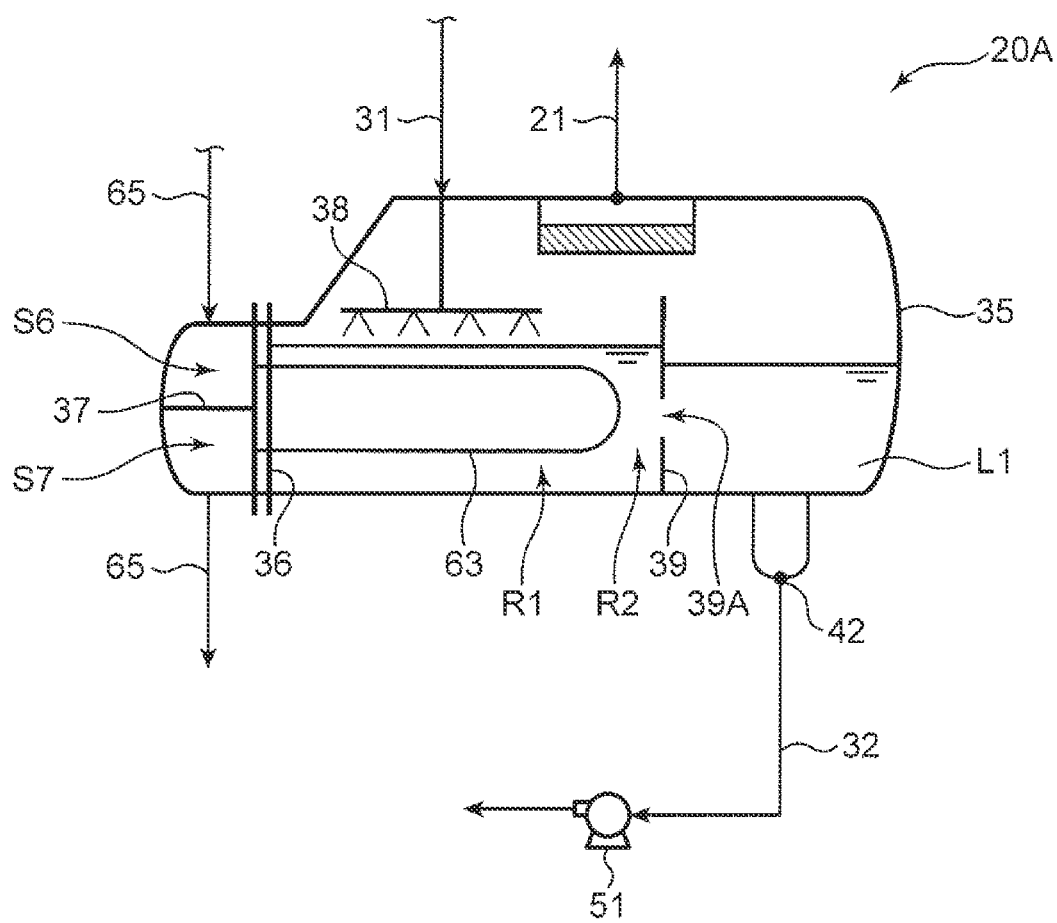
FIG. 4 is a diagram schematically illustrating a configuration of a regeneration device according to a second embodiment.

A regeneration device 20A according to a second embodiment will be described with reference to FIG. 4. The regeneration device 20A according to the second embodiment basically has a similar configuration to that of the regeneration device 20 according to the first embodiment and achieves a similar effect to that of the regeneration device 20, but is different in position of a treatment liquid feeder 38. Hereinafter, only differences from the first embodiment will be described.

The treatment liquid feeder 38 in the second embodiment is disposed close to a ceiling of a container 35. Specifically, the treatment liquid feeder 38 is located above a liquid level of a treatment liquid L1, and is disposed in the container 35 while having a nozzle ejection port facing downward (or toward a heat transfer tube of a condenser 63). The present embodiment enables the treatment liquid L1 to be stirred and mixed by an action when a jet of the treatment liquid L1 hits the liquid level.

Third Embodiment

Figure 5:
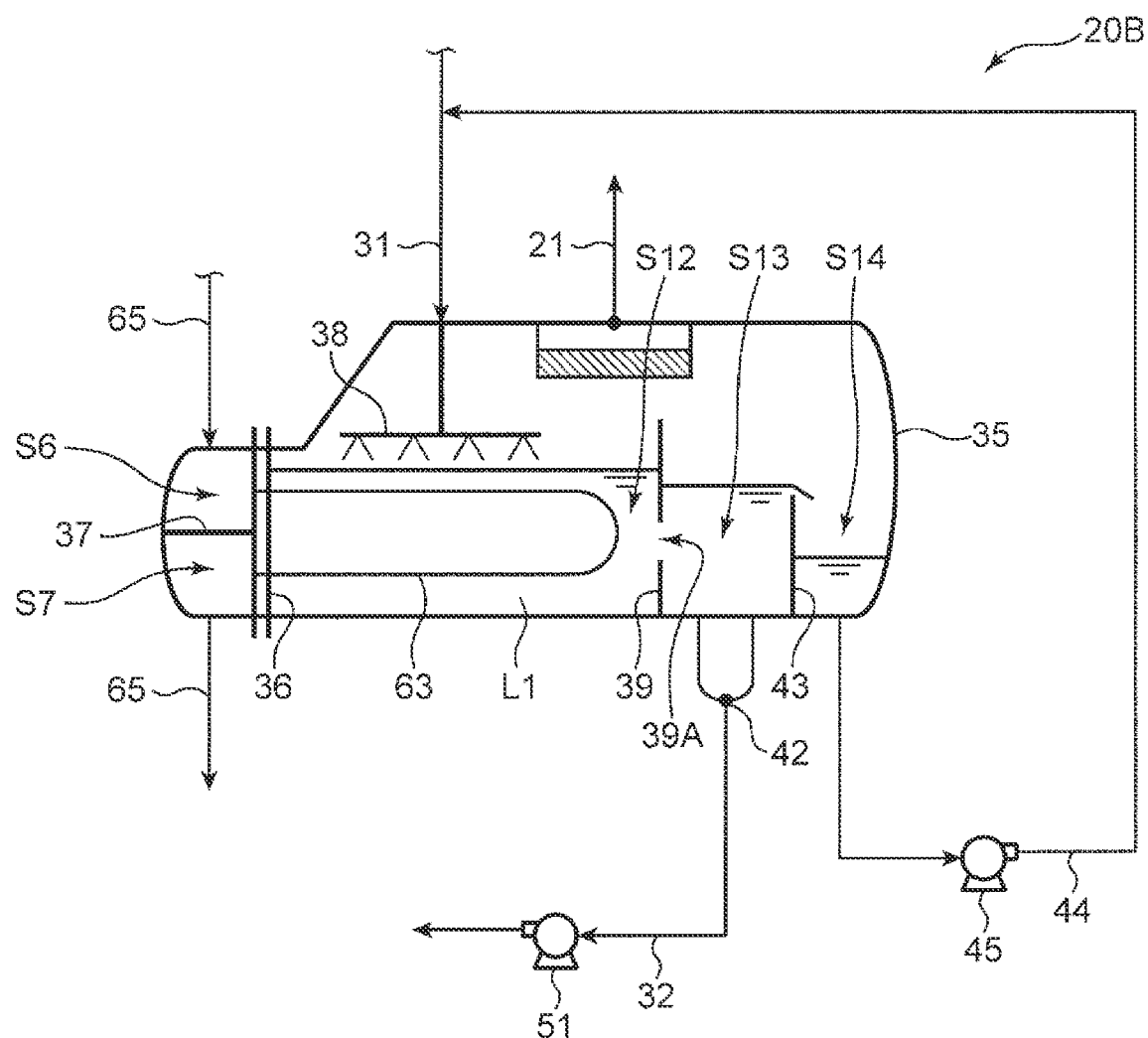
FIG. 5 is a diagram schematically illustrating a configuration of a regeneration device according to a third embodiment.

A regeneration device 20B according to a third embodiment will be described with reference to FIG. 5. The regeneration device 20B according to the third embodiment basically has a similar configuration to that of the regeneration device 20A according to the second embodiment and achieves a similar effect to that of the regeneration device 20A, but is different from the second embodiment in that a second wall 43 and a return flow path 44 are provided. Hereinafter, only differences from the second embodiment will be described.

The second wall 43 is erected from a bottom of the container 35 in the container 35, and partitions a space in the container 35 into a second space S13 and a third space S14. The second wall 43 is substantially parallel to a first wall 39 and is located opposite to a tube plate 36 as viewed from the first wall 39. That is, the second wall 43 is located opposite to a heating unit (condenser 63) with respect to the first wall 39. The second wall 43 includes an upper end over which a liquid overflows from the second space S13 to the third space S14, and the upper end is located below (or closer to the bottom of the container 35 than) an upper end of the first wall 39.

The return flow path 44 is a path for returning the liquid from the third space S14 to the first space S12. As illustrated in FIG. 5, the return flow path 44 is connected at its upstream end to a part of the bottom of the container 35, the part facing the third space S14, and is connected at its downstream end to a part of a first flow path 31, the part being close to a downstream end of the first flow path 31 (or a part downstream from a heat exchanger 40). The return flow path 44 is also provided with a liquid feed pump 45.

Even when a second liquid phase part such as an ether phase flows into the second space S13 through the opening 39A, the third embodiment enables the second liquid phase part to be easily separated from a treatment liquid L1 after regeneration in the second space S13 by causing the second liquid phase part to overflow from the upper end of the second wall 43 into the third space S14. Then, returning the second liquid phase part having overflowed into the third space S14 to the first space S12 through the return flow path 44 enables suppressing a change in a ratio of each liquid phase part (e.g., a ratio between the ether phase and the amine phase) in the treatment liquid L1 before regeneration. The treatment liquid feeder 38 in the present embodiment may be disposed close to the bottom of the container 35 as illustrated in FIG. 3.

Fourth Embodiment

Next, a regeneration device 20C according to a fourth embodiment will be described with reference to FIG. 6. The regeneration device 20C according to the fourth embodiment basically has a similar configuration to that of the regeneration device 20B according to the third embodiment and achieves a similar effect to that of the regeneration device 20B, but is different in position of an opening 39A in a first wall 39 from the third embodiment. Hereinafter, only differences from the third embodiment will be described.

Figure 6:
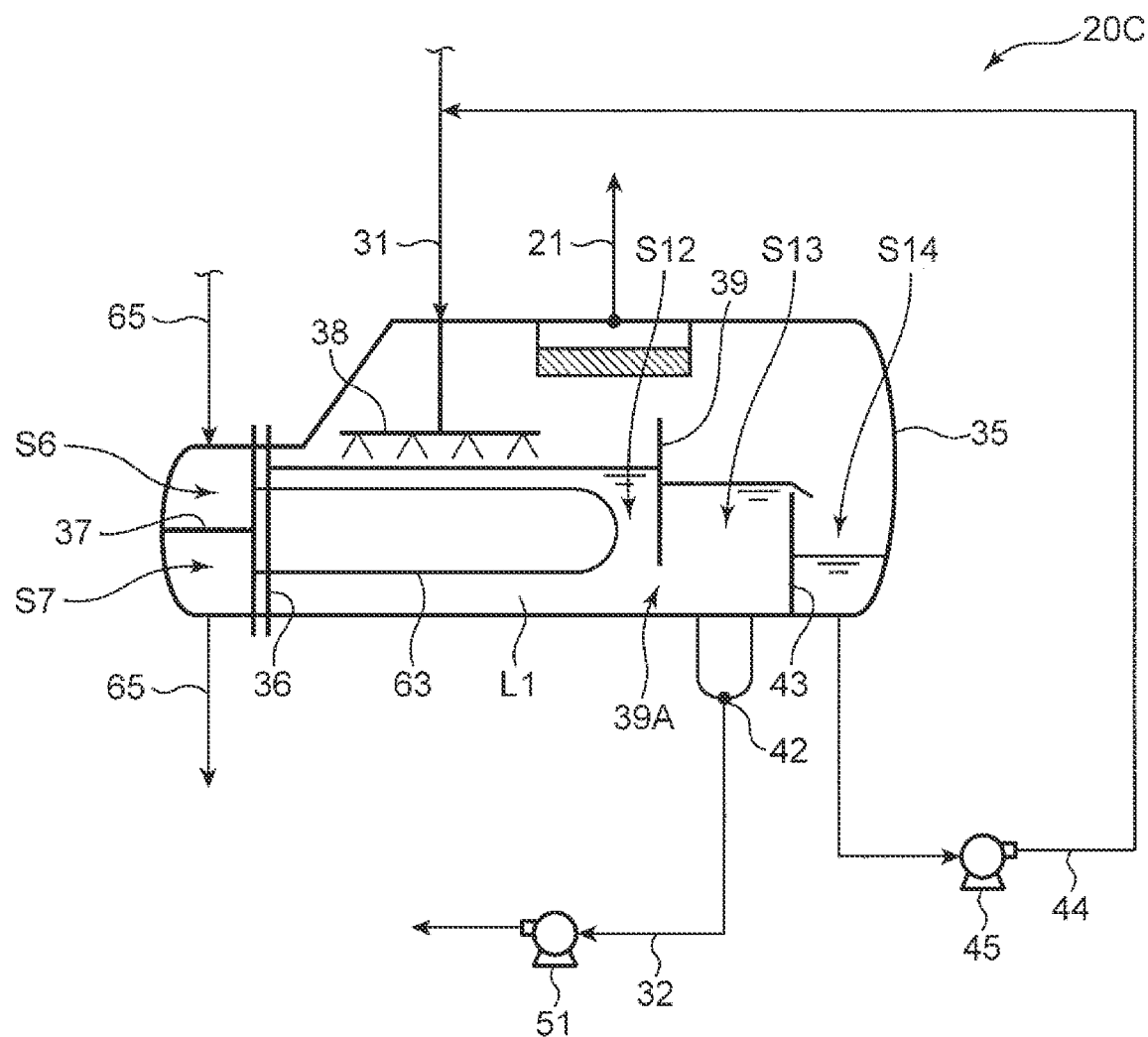
FIG. 6 is a diagram schematically illustrating a configuration of a regeneration device according to a fourth embodiment.

As illustrated in FIG. 6, the opening 39A in the fourth embodiment is formed at a lowermost part of the first wall 39 in its height direction. Even in this case, the treatment liquid L1 after regeneration can flow into a second space S13 from a first space S12 through the opening 39A.

Although the first space S12 includes each of liquid phase parts (e.g., an ether phase and an amine phase) of the treatment liquid L1 before regeneration existing above or below the treatment liquid L1 after regeneration, a significantly small feed rate of the treatment liquid L1 to the regeneration device 20 may cause no liquid phase part (e.g., the amine phase) having a larger specific gravity to exist below the treatment liquid L1 after regeneration. In this case, the treatment liquid L1 after regeneration exists near the bottom of the container 35, so that the treatment liquid L1 after regeneration can flow into the second space S13 through the opening 39A formed at the lowermost part.

The treatment liquid feeder 38 in the fourth embodiment may be disposed close to the bottom of the container 35 as illustrated in FIG. 3. The second wall 43, the return flow path 44, and the liquid feed pump 45 may not be provided.

It should be understood that the embodiments disclosed herein are illustrative in all respects and are not restrictive. The scope of the present invention is indicated by the scope of claims instead of the above description, and is intended to include meanings equivalent to the scope of claims and all modifications within the scope. Thus, the following embodiments are also included in the scope of the present invention.

Figure 7:
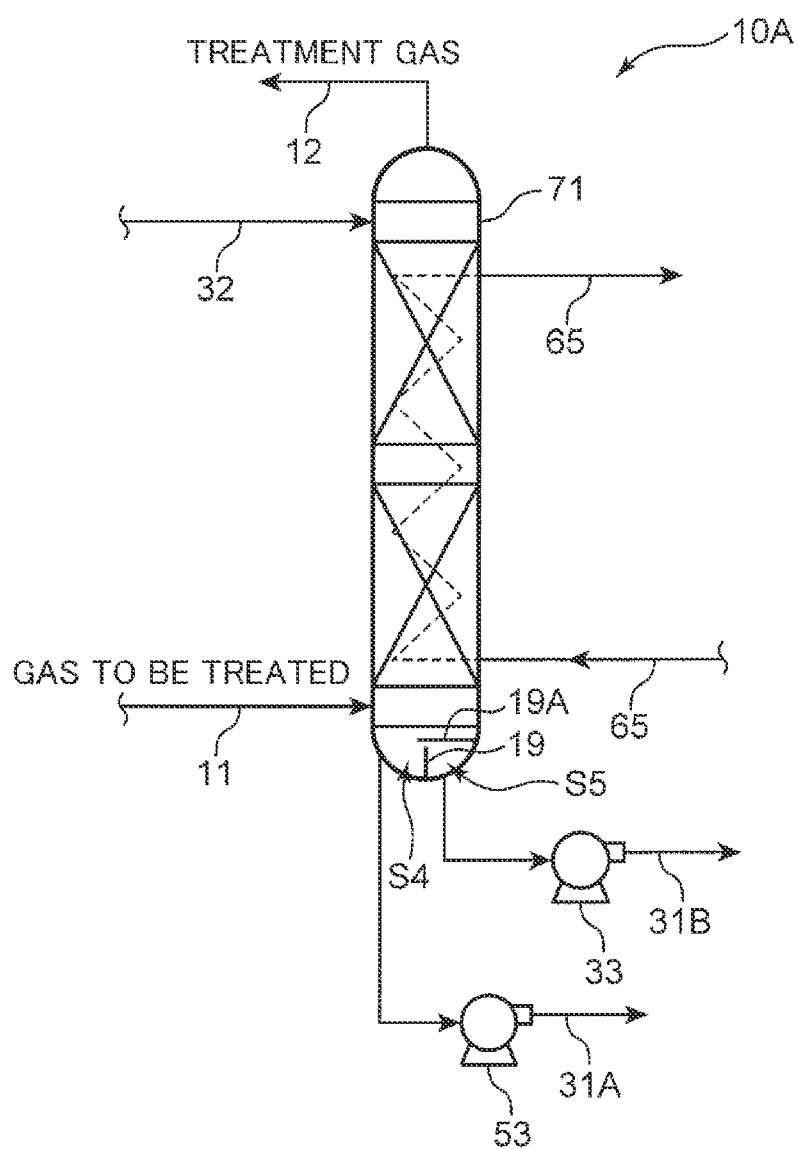
FIG. 7 is a diagram schematically illustrating a configuration of an absorption device according to another embodiment.

The embodiments described above are not limited to the absorption device 10 including the container 13 that is a horizontal tank, and thus an absorption device 10A including a container 71 of a tower-type as illustrated in FIG. 7 may be used, for example. In this case, the gas supply path 11 is connected to a lower part of the container 71, and the gas discharge path 12 is connected to the top of the container 71. Each of the branch paths (first branch path 31A and second branch path 31B) of the first flow path 31 is connected to the bottom of the container 71, and the second flow path 32 is connected to an upper part of the container 71.

The container 71 is provided on its bottom surface with a second wall 19 erected, and is partitioned into a second space S4 and a third space S5 by the second wall 19. The container 71 is also provided with a cover member 19A for covering the third space S5 from above. The treatment liquid L1 supplied from the second flow path 32 flows down in the container 71, so that the treatment liquid L1 that has absorbed an acidic compound and flowed down to a tower bottom is stored in the second space S4. After that, a first liquid phase part having a small specific gravity overflows from an upper end of the second wall 19 into the third space S5, whereby the first liquid phase part and the second liquid phase part are separated. Then, each of the liquid phase parts is extracted from the absorption device 10A through the corresponding one of the first branch path 31A and the second branch path 31B, and is fed to the regeneration device 20 at a flow rate adjusted.

Figure 8:
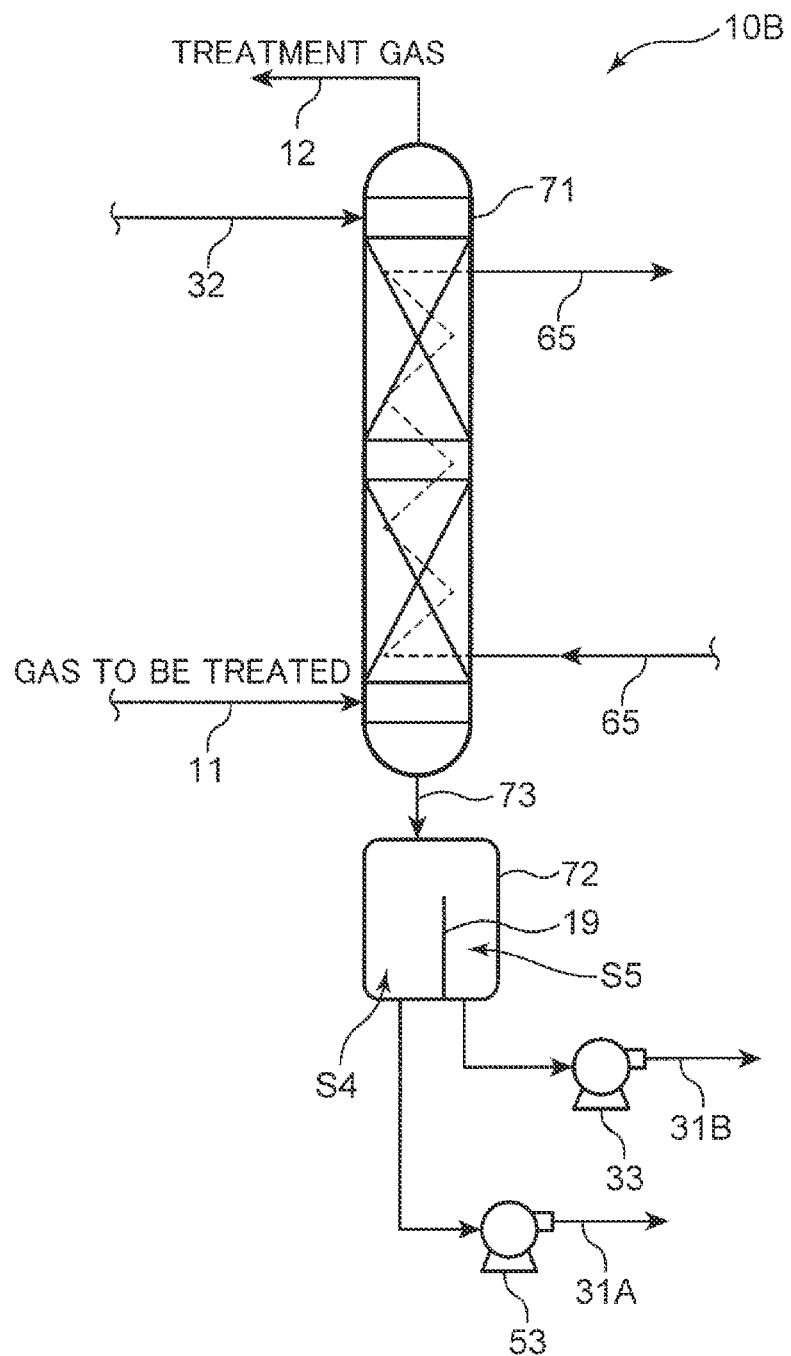
FIG. 8 is a diagram schematically illustrating a configuration of an absorption device according to still another embodiment.

As in an absorption device 10B of FIG. 8, a separation tank 72 for the treatment liquid L1 may be disposed below a container 71, and the separation tank 72 may be connected to the bottom of the container 71 with a collection path 73. The separation tank 72 may be provided on its bottom with a second wall 19 erected, and an inside space above the bottom may be partitioned into a second space S4 and a third space S5 by the second wall 19. In this case, the treatment liquid L1 that has absorbed an acidic compound and flowed into the separation tank 72 is stored in the second space S4 of the separation tank 72, and a first liquid phase part (or an upper phase part) of the treatment liquid L1 overflows from an upper end of the second wall 19 into the third space S5. Then, each of liquid phase parts is extracted from the separation tank 72 through corresponding one of a first branch path 31A and a second branch path 31B, and is fed to the regeneration device 20 at a flow rate adjusted.

Figure 9:
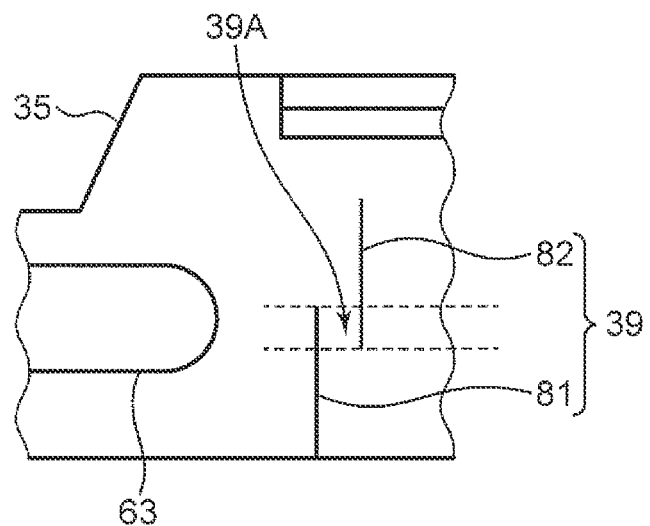
FIG. 9 is a schematic diagram for illustrating a configuration of a regeneration device according to another embodiment.
Figure 10:
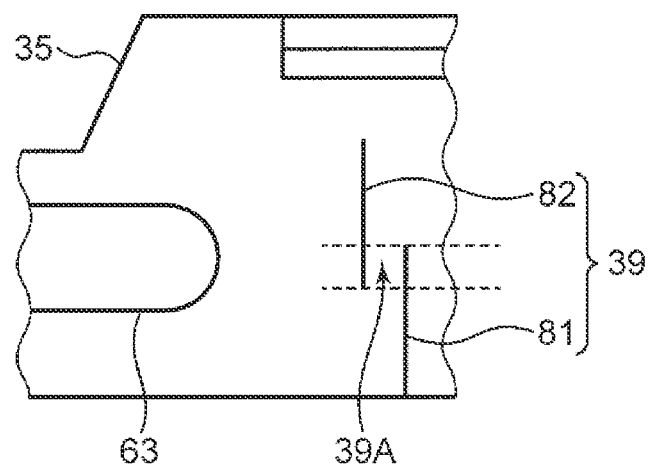
FIG. 10 is a schematic diagram for illustrating a configuration of a regeneration device according to still another embodiment.
Figure 11:
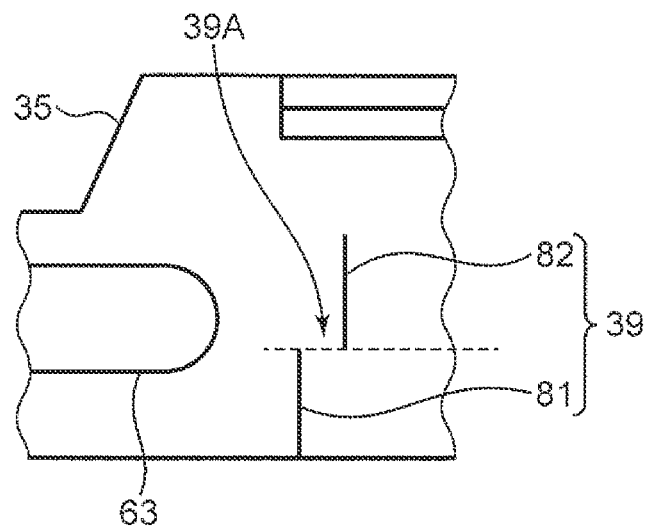
FIG. 11 is a schematic diagram for illustrating a configuration of a regeneration device according to still another embodiment.
Figure 12:
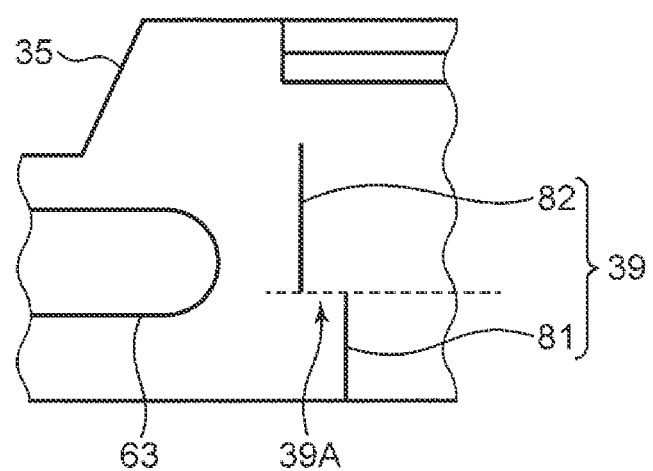
FIG. 12 is a schematic diagram for illustrating a configuration of a regeneration device according to still another embodiment.

As illustrated in FIGS. 9 to 12, a first wall 39 of a regeneration device may include a pair of wall members (first wall member 81, second wall member 82), and in this case, an opening 39A is formed by a gap between both the wall members. FIG. 9 illustrates that the first wall member 81 is erected from a bottom of a container 35, the second wall member 82 is separated from the bottom of the container 35 and disposed behind the first wall member 81 (on a side opposite to a condenser 63), and an upper end part of the first wall member 81 and a lower end part of the second wall member 82 partially overlap each other in a height direction. FIG. 10 illustrates the first wall member 81 and the second wall member 82 that are interchanged in position in a front-rear direction in FIG. 9. That is, FIG. 10 illustrates that the first wall member 81 is erected from a bottom of a container 35, the second wall member 82 is separated from the bottom of the container 35 and disposed in front of the first wall member 81 (on a side closer to a condenser 63 than the first wall member 81), and an upper end part of the first wall member 81 and a lower end part of the second wall member 82 partially overlap each other in the height direction. FIG. 11 illustrates both the wall members that are disposed with the end parts that do not overlap each other in FIG. 9. FIG. 12 illustrates both the wall members that are disposed with the end parts that do not overlap each other in FIG. 10.

Figure 13:
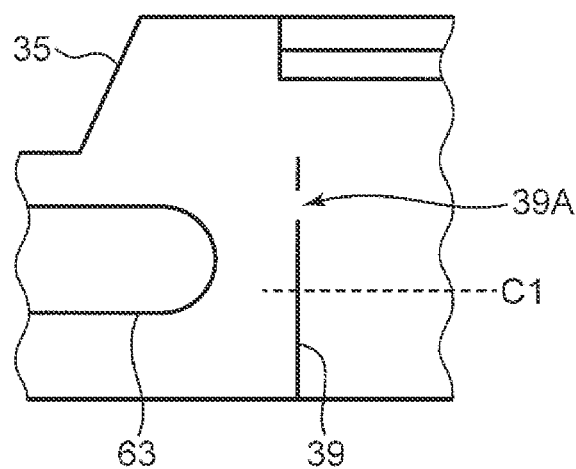
FIG. 13 is a schematic diagram for illustrating a configuration of a regeneration device according to still another embodiment.

Although the first embodiment shows an example in which the opening 39A is formed in the central part of the first wall 39 in the height direction or in the part closer to the bottom of the container 35 than the central part, the present embodiment is not limited thereto. As illustrated in FIG. 13, the opening 39A may be formed in a central part C1 in the height direction of the first wall 39 or a part above the central part C1 (on a side opposite to the bottom of the container 35 with respect to the central part C1). Even this configuration enables the treatment liquid L1 after regeneration to flow into the second space S13 when the treatment liquid L1 after regeneration is located close to the upper end of the first wall 39 depending on composition of the treatment liquid L1 or a position of a liquid level thereof.

Although the first embodiment describes a case where the heat pump 60 is provided in the gas treatment device 1, the heat pump 60 may not be provided. The treatment liquid L1 extracted from the regeneration device 20 to the outside in this case may be heated by a heating unit instead of the condenser 63 of the heat pump 60, the heating unit using an appropriate heat source such as electricity, steam, or a burner.

Here, the embodiments will be outlined.

A regeneration device according to an aspect of the present invention is for heating a treatment liquid in a phase-separated state due to absorption of an acidic compound to release the acidic compound and regenerate the treatment liquid. The regeneration device includes a container for storing the treatment liquid, and a first wall that partitions a space in the container into a first space and a second space. The first space includes: a heating region that receives the treatment liquid supplied from an outside of the container and in which a heating unit for heating the treatment liquid is disposed; and a static region that receives the treatment liquid from the heating region, the treatment liquid having released the acidic compound by being heated by the heating unit. The second space allows the treatment liquid having released the acidic compound to be discharged. The first wall is provided with an opening through which the treatment liquid in the static region flows into the second space.

This regeneration device heats the treatment liquid in a phase-separated state to release the acidic compound, and thus enabling the treatment liquid to be regenerated. The treatment liquid is stirred and mixed by the acidic compound released from the treatment liquid in the heating region during this regeneration treatment, so that a contact interface between the first liquid phase part and the second liquid phase part of the treatment liquid increases. As a result, the release of the acidic compound from the treatment liquid is promoted, so that removal of the acidic compound from gas to be treated is achieved. The present device also enables the treatment liquid after regeneration and having released the acidic compound to flow into the second space through the opening of the first wall after temporarily receiving the treatment liquid in the static region. As a result, the treatment liquid after regeneration can be easily separated from the treatment liquid before regeneration, and the treatment liquid after regeneration can be selectively extracted from the treatment liquid before regeneration.

(2) The first wall in the above regeneration device may be erected from a bottom of the container. The opening in the above regeneration device may be formed in a central part in a height direction of the first wall or in a part closer to the bottom than the central part.

This configuration enables the treatment liquid after regeneration to easily flow into the second space because the opening of the first wall is located at a height position close to a height position of the treatment liquid after regeneration.

(3) The opening in the above regeneration device may be formed at a lowermost part of the first wall in the height direction.

Although each liquid phase of the treatment liquid before regeneration exists in many cases in the first space in the container, a significantly small flow rate of the treatment liquid supplied to the container may not allow a clear liquid-liquid interface between two phases to be formed in the first space. Even in such a case, the above configuration enables the treatment liquid after regeneration to easily flow into the second space.

(4) The first wall in the above regeneration device may be erected from a bottom of the container. The opening may be formed in a central part in the height direction of the first wall or in a part closer to an upper end of the first wall than the central part.

This configuration enables the treatment liquid after regeneration to easily flow into the second space even when the treatment liquid after regeneration is located in the central part in the height direction of the first wall or in a part closer to the upper end than the central part depending on composition of the treatment liquid or a liquid level of the treatment liquid.

(5) The regeneration device may further include a treatment liquid feeder for supplying the treatment liquid to the heating region. The treatment liquid feeder may be disposed close to a bottom of the container or a ceiling of the container.

This configuration enables the treatment liquid stored in the container to be effectively stirred and mixed. Specifically, when the treatment liquid feeder is disposed close to the bottom of the container, the treatment liquid is supplied in the inside of the treatment liquid accumulated in the container, and thus the treatment liquid is stirred and mixed by a flow action at this time. As a result, the contact interface between the first liquid phase part and the second liquid phase part can be increased. In contrast, when the treatment liquid feeder is disposed close to the ceiling of the container, the treatment liquid can be stirred and mixed by an action of supplying the treatment liquid toward a liquid level of the treatment liquid.

(6) The heating unit in the above regeneration device may include a heat transfer tube through which a heating medium that exchanges heat with the treatment liquid flows, the heat transfer tube being disposed in the heating region. The treatment liquid feeder may be provided with a supply port for supplying the treatment liquid toward the heat transfer tube.

This configuration facilitates heat transfer from the heating medium to the treatment liquid, and thus enables regeneration of the treatment liquid to be promoted.

(7) The above regeneration device may further include a second wall that partitions a space in the container into the second space and a third space. The second wall may be erected from the bottom of the container, and may include an upper end over which a liquid overflows from the second space to the third space.

This configuration enables a liquid phase part having a smaller specific gravity in the treatment liquid (phase separation liquid) before regeneration to be easily separated from the treatment liquid after regeneration by allowing the liquid phase part to overflow into the third space even when the liquid phase part flows into the second space.

(8) The regeneration device may further include a return flow path for returning a liquid from the third space to the first space.

This configuration enables suppressing a change in a ratio of each liquid phase part in the treatment liquid before regeneration (phase separation liquid) by returning the liquid phase part having overflowed into the third space to the first space through the return flow path.

(9) A gas treatment device according to the embodiment includes: an absorption device for bringing gas to be treated into contact with a treatment liquid to absorb an acidic compound contained in the gas to be treated into the treatment liquid; and the regeneration device described above.

(10) A regeneration method according to the embodiment includes: supplying a treatment liquid phase-separated by absorption of an acidic compound to a first space in a container; releasing the acidic compound from the treatment liquid by heating the treatment liquid supplied to the first space; and allowing the treatment liquid having released the acidic compound to temporarily remain in the first space, and then allowing the treatment liquid to flow from the first space into a second space through an opening formed in a wall partitioning the first space and the second space.

This method enables promoting desorption of the acidic compound by stirring and mixing the treatment liquid with the acidic compound released from the treatment liquid by heating to increase the contact interface between the first liquid phase part and the second liquid phase part. This method also enables facilitating separation of the treatment liquid after regeneration from the treatment liquid before regeneration to selectively extract the treatment liquid after regeneration by allowing the treatment liquid having released the acidic compound to flow into the second space from the first space through the opening of the wall after the treatment liquid is allowed to stand in the first space.

A gas treatment method according to still another aspect of the present invention includes: bringing a gas to be treated containing an acidic compound into contact with a treatment liquid in an absorption device to cause the acidic compound to be absorbed into the treatment liquid to phase-separate the treatment liquid; feeding the phase-separated treatment liquid from the absorption device to a regeneration device; and performing the regeneration method in the regeneration device to extract the treatment liquid having released the acidic compound from the regeneration device and return the treatment liquid to the absorption device.

As is apparent from the above description, a regeneration device and a regeneration method that promote desorption of an acidic compound and enable selective extraction of a treatment liquid after regeneration, a gas treatment device including the regeneration device, and a gas treatment method in which the regeneration method is performed, can be provided.

The invention claimed is:

1. A regeneration device for heating a treatment liquid in a phase-separated state due to absorption of an acidic compound to release the acidic compound and regenerate the treatment liquid, the regeneration device comprising:
    a container for storing the treatment liquid; and
    a first wall that partitions a space in the container into a first space and a second space,
    the first space including:
    a heating region that receives the treatment liquid supplied from an outside of the container and in which a heating unit for heating the treatment liquid is disposed; and
    a static region that receives the treatment liquid from the heating region, the treatment liquid having released the acidic compound by being heated by the heating unit,
    the second space allowing the treatment liquid having released the acidic compound to be discharged to the outside of the container, and
    the first wall being provided with an opening through which the treatment liquid in the static region flows into the second space.

2. The regeneration device according to claim 1, wherein the first wall is erected from a bottom of the container, and the opening is formed in a central part in a height direction of the first wall or in a part closer to the bottom than the central part.

3. The regeneration device according to claim 2, wherein the opening is formed at a lowermost part of the first wall in the height direction.

4. The regeneration device according to claim 1, wherein the first wall is erected from a bottom of the container, and the opening is formed in a central part in a height direction of the first wall or in a part closer to an upper end than the central part.

5. The regeneration device according to claim 1, further comprising:
    a treatment liquid feeder for supplying the treatment liquid to the heating region,
    the treatment liquid feeder being disposed close to a bottom of the container or a ceiling of the container.

6. The regeneration device according to claim 5, wherein the heating unit includes a heat transfer tube through which a heating medium that exchanges heat with the treatment liquid flows, the heat transfer tube being disposed in the heating region, and the treatment liquid feeder is provided with a supply port for supplying the treatment liquid toward the heat transfer tube.

7. The regeneration device according to claim 1, further comprising:
    a second wall that partitions a space in the container into the second space and a third space, the second wall being erected from the bottom of the container and including an upper end over which a liquid overflows from the second space to the third space.

8. The regeneration device according to claim 7, further comprising a return flow path for returning the liquid from the third space to the first space.

9. A gas treatment device comprising:
an absorption device for bringing gas to be treated into contact with a treatment liquid to absorb an acidic compound contained in the gas to be treated into the treatment liquid; and
the regeneration device according to claim 1.

10. A regeneration method comprising:
supplying a treatment liquid phase-separated by absorption of an acidic compound to a first space in a container;
releasing the acidic compound from the treatment liquid by heating the treatment liquid supplied to the first space; and
allowing the treatment liquid having released the acidic compound to temporarily remain in the first space, and then allowing the treatment liquid to flow from the first space into a second space through an opening formed in a wall partitioning the first space and the second space.

11. A gas treatment method comprising:
bringing a gas to be treated containing an acidic compound into contact with a treatment liquid in an absorption device to cause the acidic compound to be absorbed into the treatment liquid to phase-separate the treatment liquid;
feeding the phase-separated treatment liquid from the absorption device to a regeneration device; and
performing the regeneration method according to claim 10 in the regeneration device to extract the treatment liquid having released the acidic compound from the regeneration device and return the treatment liquid to the absorption device.

* * * * *